United States Patent
Van Gerwen

(10) Patent No.: US 9,861,108 B2
(45) Date of Patent: Jan. 9, 2018

(54) SEALING MEMBER FOR A FOOD FORMING DRUM

(71) Applicant: GEA Food Solutions Bakel B.V., EN Bakel (NL)

(72) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 0 days.

(21) Appl. No.: 14/787,987

(22) PCT Filed: May 5, 2014

(86) PCT No.: PCT/EP2014/059094
§ 371 (c)(1),
(2) Date: Oct. 29, 2015

(87) PCT Pub. No.: WO2014/177715
PCT Pub. Date: Nov. 6, 2014

(65) Prior Publication Data
US 2016/0088850 A1 Mar. 31, 2016

(30) Foreign Application Priority Data

May 3, 2013 (EP) ..................................... 13166443

(51) Int. Cl.
*A22C 7/00* (2006.01)
*A23P 30/10* (2016.01)

(52) U.S. Cl.
CPC ............ *A22C 7/0069* (2013.01); *A22C 7/003* (2013.01); *A22C 7/0076* (2013.01); *A23P 30/10* (2016.08)

(58) Field of Classification Search
CPC ..... A22C 7/003; A22C 7/0069; A22C 7/0076; A23P 30/10

(Continued)

(56) References Cited

U.S. PATENT DOCUMENTS 2,651,808 A 9/1949 Burnett et al.
2,657,423 A 11/1953 Elsaesser
(Continued)

FOREIGN PATENT DOCUMENTS

CN 2074996 U 9/1990
DE 102006020361 A1 8/2007
(Continued)

OTHER PUBLICATIONS

International Search Report and Written Opinion of the International Searching Authority for International Application No. PCT/EP2014/059094, dated Jul. 23, 2014.
(Continued)

*Primary Examiner* — Seyed Masoud Malekzadeh
(74) *Attorney, Agent, or Firm* — The Dobrusin Law firm, P.C.

(57) ABSTRACT

A sealing member that includes an upstream first end and an opposite downstream second end. The upstream first end is located upstream of a feed member that supplies food product to the food forming member, and the downstream second end is located downstream of the feed member. The upstream first end includes a multitude of recesses and convexities. Food product that is transported by the food forming member towards the sealing member is guided toward or into product cavities defined in rows around the surface of the food forming member with the convexities and the recesses. Each of the recesses has a shape that generally corresponds to a shape of the product cavities, and each of the recesses are aligned with the product cavities extending in one of the rows. Each of the convexities are aligned with the surface of the food forming member located between the product cavities.

16 Claims, 11 Drawing Sheets

(58) Field of Classification Search
USPC .................................. 425/362, 292, 192 R
See application file for complete search history.

(56) References Cited

U.S. PATENT DOCUMENTS

| | | |
|---|---|---|
| 3,177,524 A | 4/1965 | Gause |
| 3,205,837 A | 9/1965 | Fay |
| 3,213,486 A | 10/1965 | Blake |
| 3,347,176 A | 10/1967 | Hall |
| 3,427,649 A | 2/1969 | Fay |
| 3,501,807 A | 3/1970 | Selbach Hans-Werner |
| 3,503,342 A | 3/1970 | Ilines |
| 3,724,026 A | 4/1973 | Ciernandt |
| 3,727,308 A | 4/1973 | Ross |
| 3,750,232 A | 8/1973 | Holly |
| 3,823,633 A | 7/1974 | Ross |
| 3,856,680 A | 12/1974 | Elmore |
| 3,991,440 A | 11/1976 | Hendrickson |
| 3,998,574 A | 12/1976 | Blake |
| 4,038,010 A | 7/1977 | Bremer |
| 4,182,003 A | 1/1980 | Lamartino et al. |
| 4,212,609 A * | 7/1980 | Fay ................. A21C 9/04 425/100 |
| 4,272,864 A | 6/1981 | Holly |
| 4,338,702 A | 7/1982 | Holly |
| 4,356,595 A | 11/1982 | Sandberg et al. |
| 4,372,008 A | 2/1983 | Sandberg |
| 4,418,446 A | 12/1983 | Sandberg |
| 4,582,226 A | 4/1986 | Doak |
| 4,625,612 A | 12/1986 | Oliver |
| 4,630,425 A | 12/1986 | Reed |
| 4,630,426 A | 12/1986 | Gentry |
| 4,630,725 A | 12/1986 | Steurner |
| 4,768,325 A | 9/1988 | Lindee et al. |
| 4,821,376 A | 4/1989 | Sandberg |
| 4,849,113 A | 7/1989 | Hills |
| 4,957,425 A | 9/1990 | Fay |
| 4,987,643 A | 1/1991 | Powers |
| 5,021,025 A | 6/1991 | Wagner |
| 5,102,238 A | 4/1992 | Contzen |
| 5,411,390 A * | 5/1995 | Fay ................. A23G 3/0289 425/145 |
| 5,503,033 A | 4/1996 | Van Niekerk |
| 5,536,329 A | 7/1996 | St. Martin |
| 5,567,463 A | 10/1996 | Schaaf |
| 5,866,176 A | 2/1999 | Baars et al. |
| 6,131,372 A | 10/2000 | Pruett |
| 6,368,092 B1 | 4/2002 | Lindee |
| 6,371,278 B1 | 4/2002 | Hart et al. |
| 6,764,293 B2 | 7/2004 | Kashulines et al. |
| 6,838,040 B2 * | 1/2005 | Mlinar ................. B26F 3/002 225/2 |
| 6,902,754 B1 * | 6/2005 | Evans ................. A21C 11/04 426/503 |
| 7,146,992 B2 | 12/2006 | Elick et al. |
| 7,264,459 B2 * | 9/2007 | Gosz ................. A23P 30/10 425/192 R |
| 7,467,636 B2 | 12/2008 | Welch |
| 7,677,880 B2 | 3/2010 | Moore et al. |
| 7,819,650 B2 | 10/2010 | Meskendahl et al. |
| 7,824,599 B2 | 11/2010 | Azzar et al. |
| 7,931,461 B2 | 4/2011 | Van Der Eerden et al. |
| 7,976,303 B2 * | 7/2011 | van der Eerden ... A22C 7/0069 425/241 |
| 8,047,902 B2 | 11/2011 | Van Esbroeck et al. |
| 8,747,934 B2 | 6/2014 | Meskendahl et al. |
| 8,770,962 B2 | 7/2014 | Van der Eerden et al. |
| 9,028,239 B2 | 5/2015 | Van Gerwen |
| 9,060,544 B2 | 6/2015 | Meskendahl et al. |
| 9,114,553 B2 | 8/2015 | Lindee et al. |
| 2001/0022328 A1 | 9/2001 | Oh |
| 2002/0012731 A1 | 1/2002 | Van Esbroeck et al. |
| 2002/0046696 A1 | 4/2002 | Lang |
| 2005/0013895 A1 | 1/2005 | Azzar |
| 2005/0042321 A1 | 2/2005 | LaBruno |
| 2005/0214399 A1 | 9/2005 | LaBruno et al. |
| 2005/0220932 A1 * | 10/2005 | van der Eerden ... A22C 7/0069 426/1 |
| 2007/0028742 A1 | 2/2007 | Mueller et al. |
| 2007/0098862 A1 | 5/2007 | Hansen et al. |
| 2007/0224305 A1 | 9/2007 | Meskendahl et al. |
| 2008/0008799 A1 | 1/2008 | Zugar |
| 2008/0202226 A1 | 8/2008 | Heim et al. |
| 2009/0134544 A1 | 5/2009 | Van der Eerden et al. |
| 2010/0196564 A1 | 8/2010 | Cepeda Mendoza et al. |
| 2011/0014344 A1 | 1/2011 | Meskendahl et al. |
| 2011/0151082 A1 | 6/2011 | VanGerwen |
| 2012/0003374 A1 | 1/2012 | Van der Eerden et al. |
| 2012/0015065 A1 | 1/2012 | Van der Eerden et al. |
| 2012/0058213 A1 | 3/2012 | Lindee et al. |
| 2012/0177786 A1 | 7/2012 | Van der Eerden et al. |
| 2013/0045294 A1 | 2/2013 | Van Gerwen et al. |
| 2013/0164403 A1 | 6/2013 | Boogers et al. |
| 2013/0224357 A1 | 8/2013 | Van Gerwen |
| 2013/0273192 A1 | 10/2013 | Van Gerwen |
| 2013/0291483 A1 | 11/2013 | Van Gerwen |
| 2013/0337128 A1 | 12/2013 | Van Gerwen et al. |
| 2014/0037811 A1 | 2/2014 | Colosimo |
| 2014/0199423 A1 | 7/2014 | Righolt et al. |

FOREIGN PATENT DOCUMENTS

| | | |
|---|---|---|
| EP | 0 638 371 A1 | 2/1995 |
| EP | 0818148 A1 | 1/1998 |
| EP | 1520480 B1 | 4/2005 |
| EP | 1920847 A1 | 5/2008 |
| EP | 2064956 A1 | 6/2009 |
| EP | 2380442 A2 | 10/2011 |
| EP | 2595489 A1 | 1/2012 |
| FR | 2387609 A1 | 11/1978 |
| GB | 965468 A | 7/1964 |
| GB | 1015820 A | 1/1966 |
| GB | 2312641 A | 11/1997 |
| JP | 56-1868 A | 1/1981 |
| JP | S57-43637 A | 3/1982 |
| JP | S58-056632 | 4/1983 |
| JP | 03-108471 | 5/1991 |
| JP | H08-116861 A | 5/1996 |
| JP | 2001-200767 A | 7/2001 |
| JP | 2001299317 A | 10/2001 |
| JP | 2002-224508 A | 8/2002 |
| JP | 2004-521652 A | 7/2004 |
| JP | 2005-530514 A | 10/2005 |
| JP | 2007-536927 A | 12/2007 |
| WO | 88/07003 A1 | 9/1988 |
| WO | 96/09210 A1 | 3/1996 |
| WO | 2004/002229 A2 | 1/2004 |
| WO | 2005/009696 A1 | 2/2005 |
| WO | 2005/107481 | 11/2005 |
| WO | 2005/107482 A1 | 11/2005 |
| WO | 2006/020139 A1 | 2/2006 |
| WO | 2008/091634 A2 | 7/2008 |
| WO | 2010/110655 A1 | 9/2010 |
| WO | 2012/012581 A1 | 1/2012 |
| WO | 2012/055454 A2 | 5/2012 |
| WO | 2012/059188 A1 | 5/2012 |
| WO | 2012/107236 A2 | 8/2012 |
| WO | 2013014010 A1 | 1/2013 |
| WO | 2014/148897 A2 | 9/2014 |

OTHER PUBLICATIONS

International Preliminary Report on Patentability, Serial No. PCT/EP2014/059094, dated Jul. 28, 2015.

Chinese Office Action with translation for 201280006194.5, dated Nov. 3, 2014, Applicant CFS Bakel B.V.

European Patent Office Action regarding Application No. 12 702 177.2-1708, dated Mar. 16, 2015.

European Search Report Application No. EP10014291.8, dated Apr. 20, 2011.

European Search Report Application No. EP10016025.8, dated Nov. 25, 2011.

(56) References Cited

OTHER PUBLICATIONS

European Search Report Application No. EP11000571.7, dated Dec. 23, 2011.
International Preliminary Report on Patentability, Serial No. PCT/EP2011/006458, dated Apr. 18, 2013.
International Preliminary Report on Patentability, Serial No. PCT/EP2012/063840, dated Dec. 18, 2013.
International Prelimillary Report PCT/EP2011/005345, dated Nov. 30, 2012.
International Preliminary Report PCT/EP2012/000226, dated Apr. 22, 2013.
International Preliminary Report PCT/EP2012/000377, dated Aug. 1, 2011.
International Search Report and Written Opinion of the International Search Authority, Application No. PCT/EP2011/006458, dated Jun. 13, 2012.
International Search Report and Written Opinion of the International Search Authority Application No. PCT/EP2012/000226 dated May 9, 2012.
International Search Report and Written Opinion PCT/EP2011/005345, dated Jan. 25, 2012.
International Search Report and Written Opinion PCT/EP2012/000610, dated Oct. 8, 2012.
International Search Report, Serial No. PCT/EP2012/063840, dated Aug. 10, 2012.
Japanese Office Action with translation for Application No. 2013-545105 dated Jul. 28, 2015.
Japanese Office Action with translation for Application No. 2013-537024 dated May 29, 2015.
Notice of Allowance, U.S. Appl. No. 14/269,465, dated Jan. 26, 2015.
Office Action dated Jan. 20, 2015, for U.S. Appl. No. 13/883,152.
Potentially related U.S. Appl. No. 13/982,377 Published as 2013/0337128, Dec. 19, 2013.
Potentially related Application, U.S. Appl. No. 13/883,152 Published as 2013/0224357, Aug, 29, 2013.
Potentially related Application, U.S. Appl. No. 13/944,973 Published as 2013/0273192, Oct. 17, 2013.
Potentially related Application, U.S. Appl. No. 13/980,778 Published as 2013/0291483, Nov. 7, 2013.
Potentially related Application, U.S. Appl. No. 14/232,970 Published as 2014/0199423, Jul. 17, 2014.
Priority Application, U.S. Appl. No. 61/366,033, dated Jul. 20, 2010.
The State Intellectual Property Office of China Office Action regarding Application No. 201280006194.5 dated Nov. 3, 2014.
Third Party Observation Document filed for EP Application No. 10014291.8 dated Mar. 13, 2015.
Third Party Observation for European Patent Office Application Nos. EP2468104 and EP2654439, dated Jul. 3, 2015.
*Townsend Further Processing News*, brochure, published Jun. 2010.
European Examination report dated May 31, 2017 for European Patent Application No. 14 721 849.9-1655.

\* cited by examiner

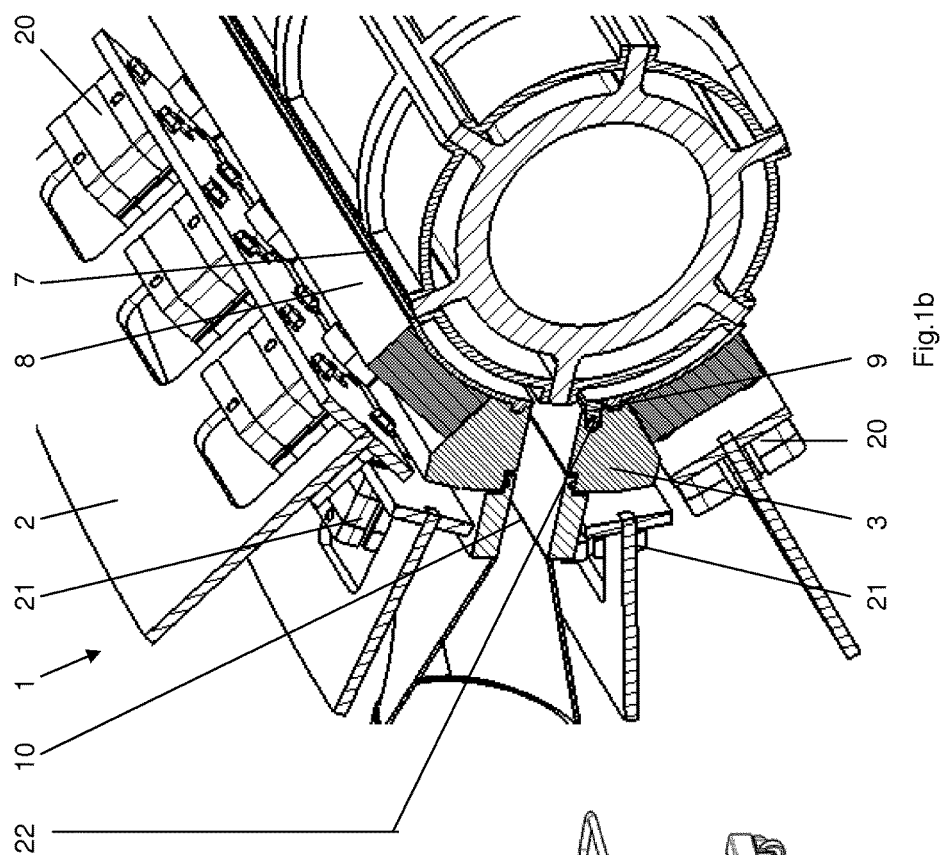
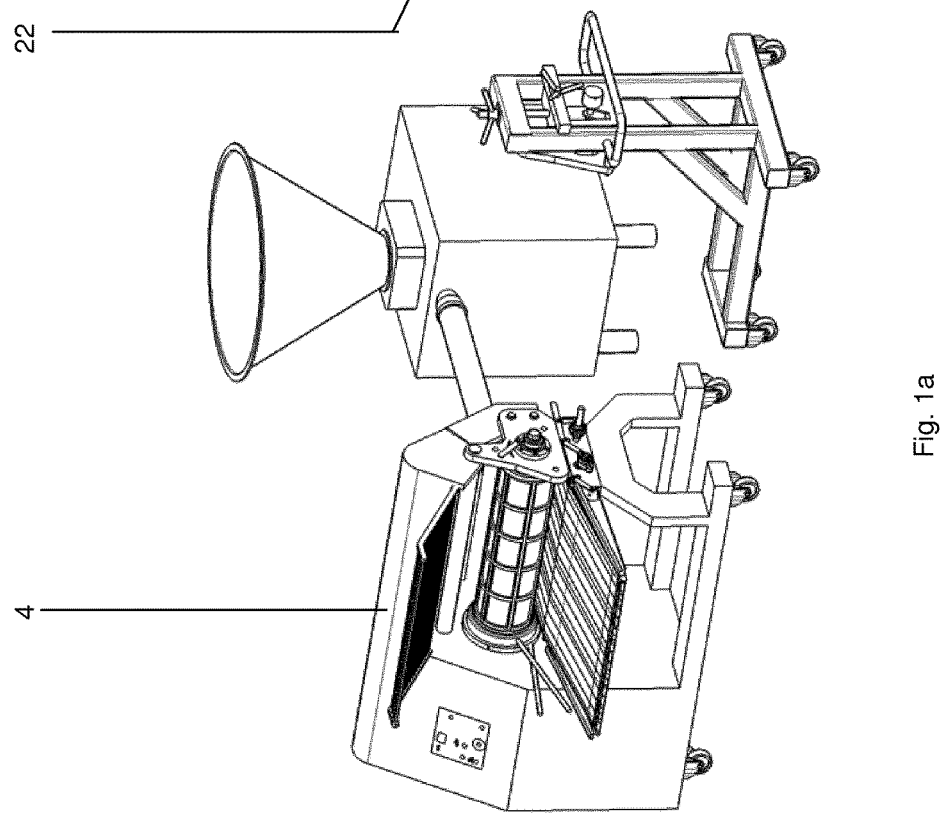
Fig. 1a
Fig. 1b

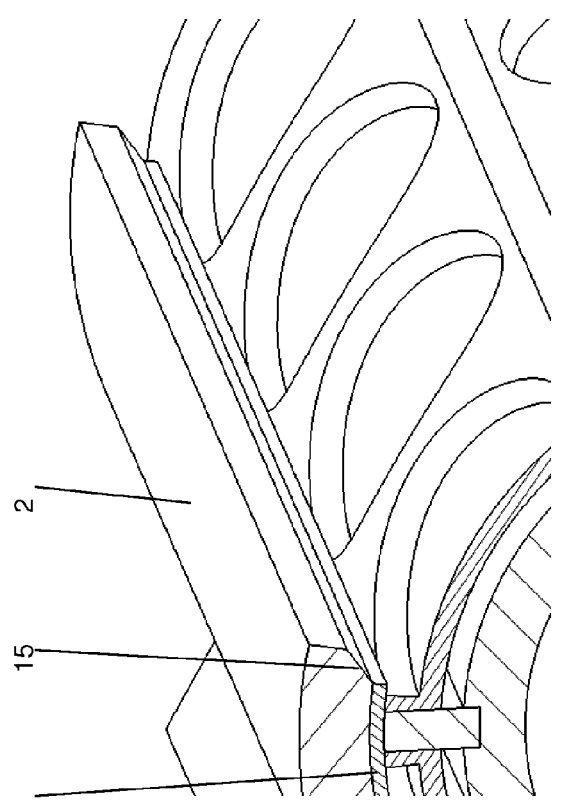
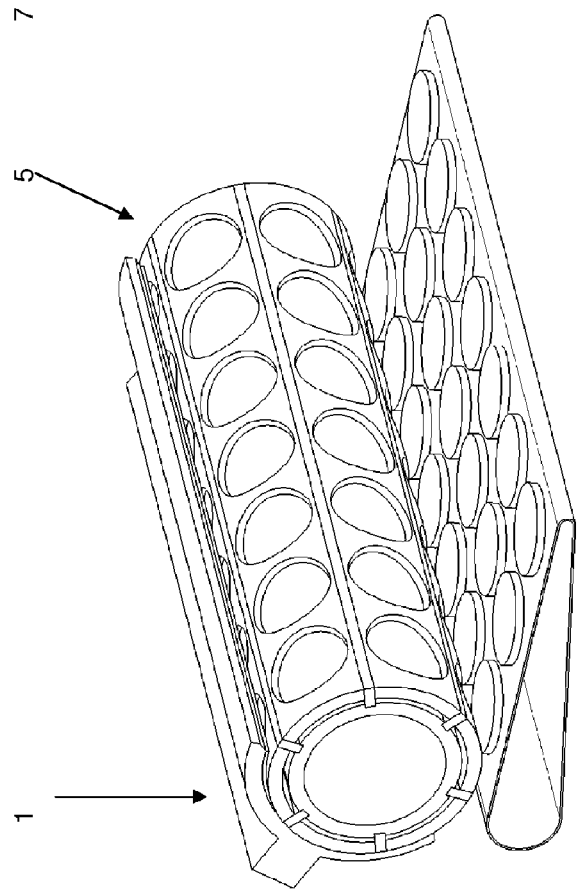
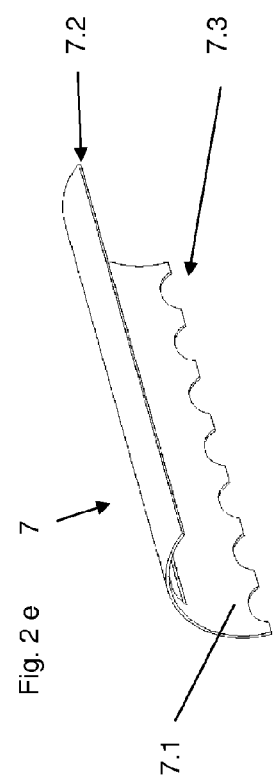

SEALING MEMBER FOR A FOOD FORMING DRUM

FIELD

The present invention relates to a sealing member whose surface interacts sealingly with the surface of a food forming member and which has a first end and opposite a second end.

BACKGROUND

Such sealing members are well known from the state of the art and normally extend around the feed channel for a food mass, which is pressed through the feed channel and into product cavities, which are provided in a movable food forming member. In the product cavities, the food mass is formed into individual products such as patties or the like. The sealing member is in contact with the surface of a food forming member and sealingly interacts with this surface to avoid that food mass is spilled during filling of the product cavities. In the food industry, there is a constant demand to improve the quality of the product, the yield and/or to reduce ware of the machines.

SUMMARY

It is therefore the objective of the present invention to provide a sealing member that meets such needs.

The objective is achieved with a sealing member whose surface interacts sealingly with the surface of a food forming member and which has a first end and opposite a second end, characterized in, that at least one end comprises at least one recess.

The disclosure regarding the embodiment of the present invention also applies to the other embodiments of the present invention and vice versa.

The present invention relates to a sealing member of a food forming apparatus. Such a sealing member preferably has a plate-like shape. Conventionally, the sealing member extends around a feed channel for a food mass, which is pressed through the feed channel and into product cavities, which are provided in a food forming member, for example a plate or a drum, which moves relative to the feed channel. In the product cavities, the food mass is formed into individual products such as patties or the like. The sealing member is in contact with the surface of a food forming member and thus sealingly interacts with this surface to avoid that food mass is spilled during filling of the product cavities. The sealing member is preferably flexible to maximize the contact area to the food forming member. The sealing member comprises a first and an opposite second end, which, for example extend parallel to an axis of rotation of a food forming drum which rotates or perpendicular to the movement of a plate which reciprocates between a filling- and a discharge position.

In case of a rotating drum, the first end is located upstream from the feed channel and relative to the rotation of the drum. Correspondingly, the second end is located downstream from the feed channel.

The sealing member is directly or indirectly connected to the frame of a food forming apparatus and thus preferably stationary. A food forming member moves relative to the sealing member.

According to the present invention, at least one of the first- and/or the second end comprises a recess, so that the surface of this end is not a plane. Due to this recess, the contact area of the sealing member and the food forming member is reduced in comparison to a sealing member, with the same extensions but without the recess.

Preferably, the shape of the circumference of each recess located at the second end of the sealing member partially corresponds to the shape of the circumference of the product cavities. Preferably, each recess is aligned with a product cavity. Due to the recess, the smearing of the resulting product is reduced.

A recess at the first end preferably moves food product which sticks to the surface of the forming member towards and/or into a product cavity. Preferably, each recess at this end is aligned with a product cavity that moves beneath the recess.

Preferably, the cross section of the recess, at the first and/or second end, which is parallel to the contact area with the food forming member is the segment of a circle, is square, rectangular or trapezoid.

Preferably, the sealing member comprises a recess between the first- and the second end through which the food mass is forced into the product cavities. This recess is in the following the "filling recess".

In a preferred embodiment, the first- and/or the second end comprises a multitude of recesses and a convexity between two recesses. The convexity may have any shape, which more preferably results from two adjacent recesses. The convexity may be essentially spare, essentially rectangular, essentially a triangle, essentially a wedge, essentially a trapezoid or a combination thereof. More preferably, the tip of the convexity, which is located in the upstream region of the convexity is sloped towards each recess. Food product, which is transported by the food forming member towards the sealing member is guided towards or into the product cavities of the food forming member. According to a preferred embodiment, the convexity is shaped as a wedge.

According to a preferred or inventive embodiment of the present invention, the thickness of the seal plate is reduced at least at one of the first- and/or second end.

The disclosure regarding the embodiment of the present invention also applies to the other embodiments of the present invention and vice versa.

Due to this reduction, the sealing member is, at its first end preferably not in contact with the food forming member, wherein the gap between the surface of the sealing member and the adjacent surface of the food forming member decreases from the first end towards the filling recess of the sealing member.

According to yet another preferred or inventive embodiment of the present invention, the sealing member comprises a guiding element which guides food mass towards the center of the sealing member.

The disclosure regarding the embodiment of the present invention also applies to the other embodiments of the present invention and vice versa.

This guiding member extends parallel to the direction of movement of the food forming member.

In case the food forming member is a drum, the guiding member is preferably a ring or the segment of a ring. The diameter of the ring may vary over its length.

Preferably, the sealing member comprises a cutting member. This cutting member is preferably located downstream from the filling recess or is part of the filling recess. The cutting member cuts off filaments or the like and/or cuts off food mass that extends out of the product cavity.

Preferably, the cutting member and the sealing member are a single piece, for example molded during one molding step.

In a preferred embodiment, the cutting edge of the cutting member is profiled, preferably toothed, which enlarges the cutting edge in comparison to a straight cutting edge and/or increases the local cutting pressure.

Another subject matter of the present invention is a food forming apparatus comprising a food forming member with product cavities and a feed channel through which a food mass is pressed into the product cavities, wherein the inventive sealing member extends around the surface of the food forming member.

The disclosure regarding the embodiment of the present invention also applies to the other embodiments of the present invention and vice versa.

The food forming apparatus according to the invention comprises a food forming member, preferably a food forming drum, which has a multitude of product cavities arranged around the outer circumference of the drum. The product cavities are preferably made from a porous material, so that the formed products can be removed from the cavities for example by compressed air. Furthermore, the food forming apparatus comprises a feed channel through which the food mass, for example minced meat and/or chunks of meat are pressed into the product cavities. The food forming member moves, for example rotates, past this feed channel and during this movement, the product cavities are filled with the food mass and thereby products, for example patties, schnitzels or the like, are formed. Downstream, relative to the movement of the forming member or in the so called discharge section, the products are removed from the forming member and then the product cavities can be filled again.

According to the present invention, the food forming apparatus comprises the inventive sealing member, which extends around the surface of the food forming member and is in sealing cooperation with the surface of the food forming member.

The sealing member preferably extends upstream and downstream from the filling channel. However, downstream, preferably, the sealing member only covers the product cavities during their filling. Right after the product cavity is filled with a food mass, which is pressed into the product cavity with a filling pressure, this product cavity is preferably subjected to ambient pressure, i.e. the surface of the cavity is at least partially opened.

Preferably, the sealing member comprises a cutting member. The cutting member may extend parallel to the surface of the food forming member or not.

According to a preferred or another inventive subject matter of the present invention, the food forming apparatus comprises a manifold around the feed channel, wherein a pressure is extended on a cutting member which is independent from the pressure extended on the manifold.

Preferably, the inventive food forming apparatus comprises a stabilization block, which is located adjacent to the sealing member, preferably, this stabilization block is sloped at its upstream end to guide food mass which sticks on the food forming member, preferably the drum into a product cavity.

The inventions are now explained according to FIGS. 1-11. These explanations do not limit the scope of protection. The explanations apply to all subject matters of the present invention likewise.

BRIEF DESCRIPTION OF THE DRAWINGS

FIGS. 1a and 1b show a forming apparatus.

DETAILED DESCRIPTION

Figure 2:
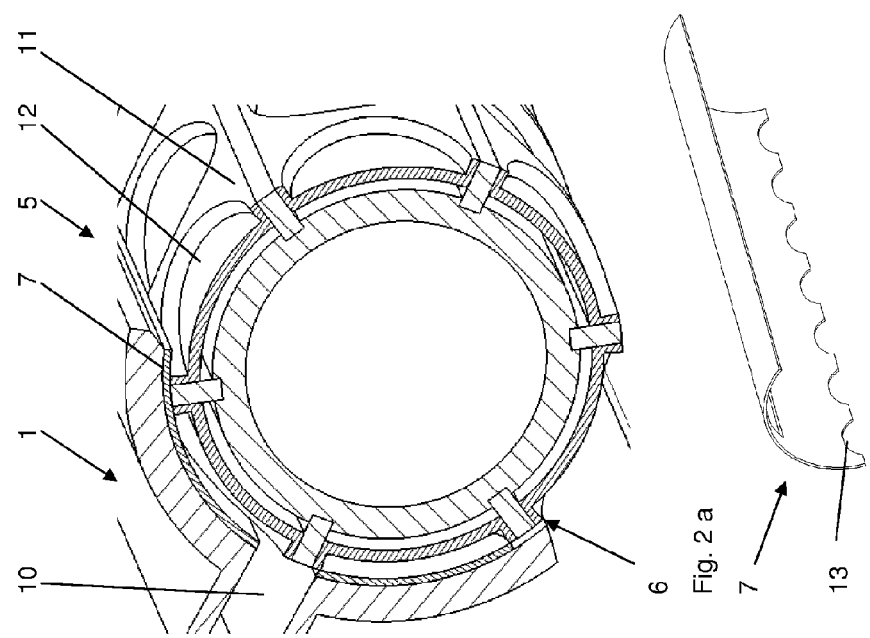
FIGS. 2a-2l and 3 show the inventive sealing member
Figure 2:
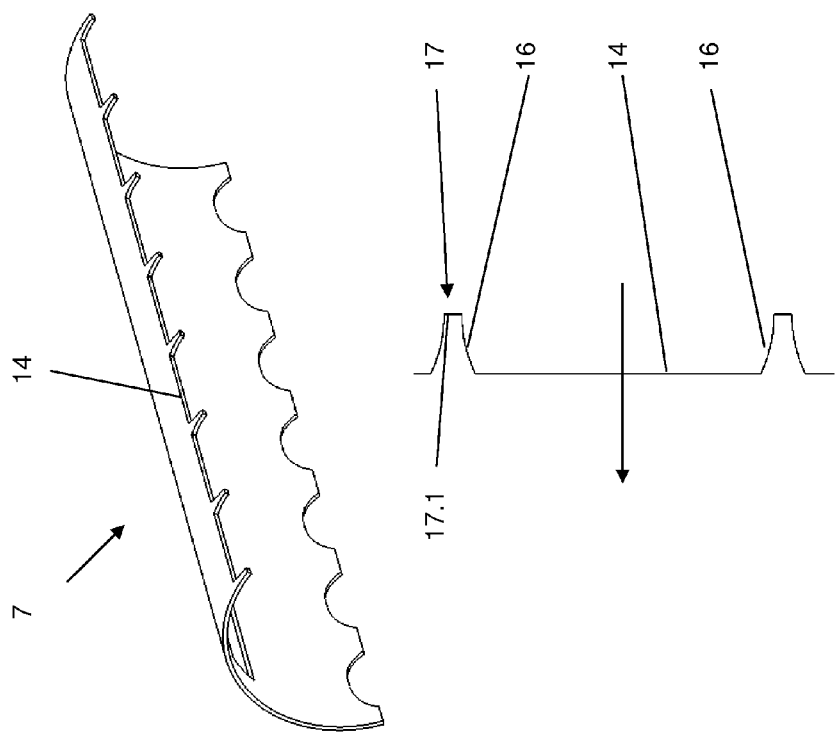
Figure 2:
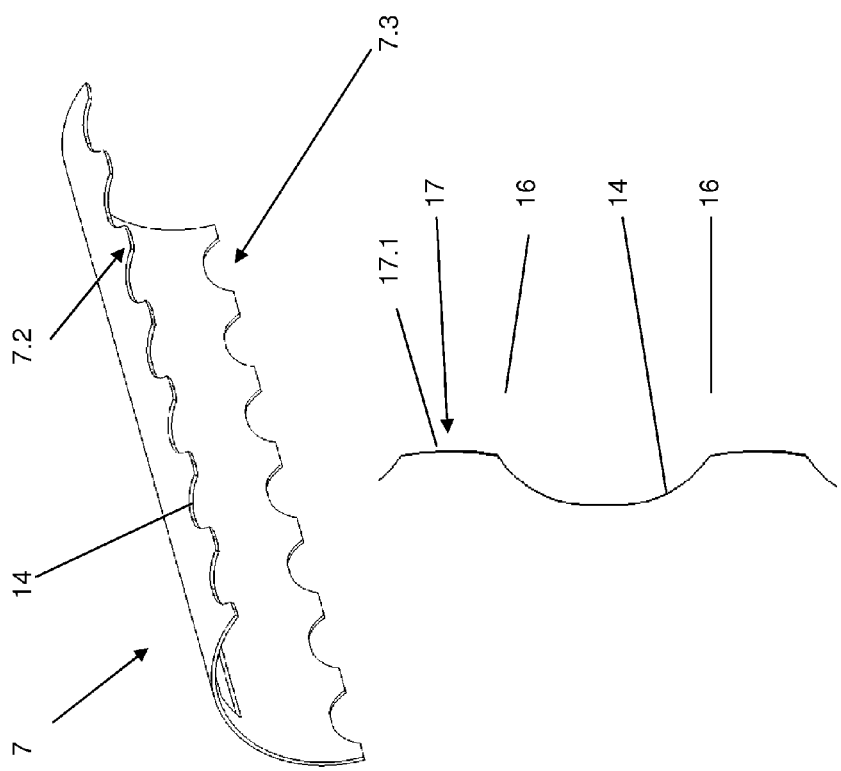
Figure 2:
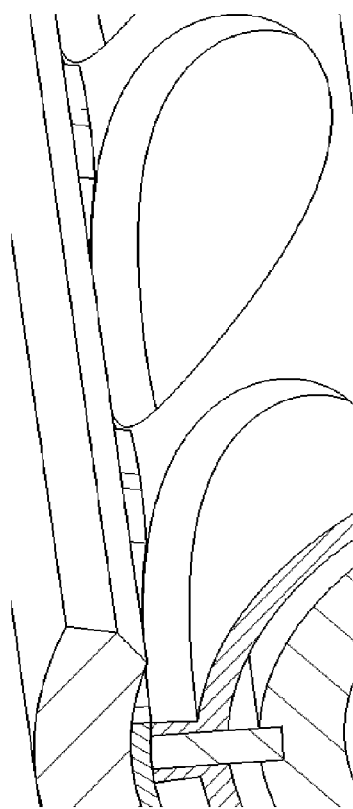
Figure 2:
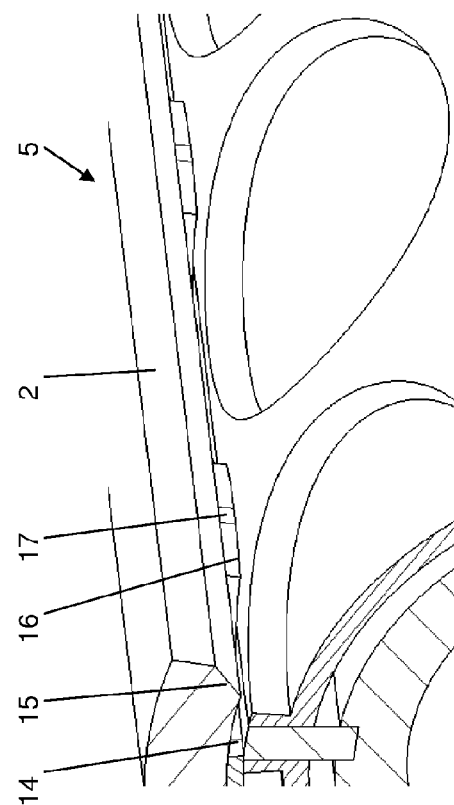
Figure 2:
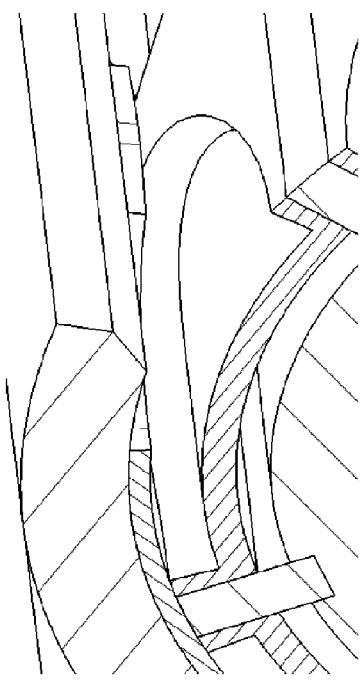

FIGS. 1a and 1b show the inventive food forming apparatus 4. The food forming apparatus 4 comprises a rotating drum 11, which rotates in the present case counter-clockwise and is mounted rotatable at the frame of the inventive apparatus 4. At the outer circumference of the drum a multitude of product cavities 12 are provided, which are filled with a food mass, for example minced meat or meat chunks to form the resulting food product. Around its circumference the drum comprises a multitude cavities, here six cavities, which are spaced preferably equidistantly. The drum further comprises a multitude of cavities, which are placed in rows side by side parallel to the axis of rotation of the drum. The cavities in each of these rows are filled and emptied simultaneously. The product cavities are preferably made from a porous material, for example sintered metal, so that the formed products can be ejected from the product cavities 12 with compressed gas and/or liquid. The inventive apparatus further comprises a food mass feed member 1, whose housing 2 is, at one end mounted at a frame of the inventive apparatus, for example by means of a hinge. The other, preferably opposite end is also connected to the frame, for example by means of a lever. Preferably, the lever is adjustable to adjust the position of the food mass feed member 1 relative to the drum 11. The housing 2 is preferably very stiff, i.e. the housing 2, at least essentially does not deform under normal operation conditions. Preferably, the housing is made from metal, more preferably steel and/or from a fibre, preferably glass-fibre reinforced plastic material. The width of the food mass feed member 1 is at least essentially equal to the length of the drum 11. The member 1 comprises a feed channel 10, through which a food mass starting material is pumped into the cavities 12 of the drum. The feed channel 10 comprises in the present case a manifold 3, which has here a rectangular cross section. In the present case, the manifold 3 presses against a sealing member 7, here a sealing plate which is in direct contact with outer surface of the drum 11. The manifold 3 is pressed against the sealing plate 7 by pressure means 21 the sealing plate 7 seals the food mass feed member 1 against the drum, in order to avoid leakage between the food mass feed member 1 and the drum 11. The sealing plate 7 extends upstream and downstream from the feed channel 10. The sealing member 7 can be made from a single- or more piece(s). Preferably, the sealing member 7 is a flexible, preferably thin, more preferably preformed plate, that extends over the entire axial extension of the drum and which is pressed against the outer surface of the drum to avoid leakage of food particles and/or food-juice. The pressure of the manifold 3 and/or the sealing plate(s) 7 against the drum 11 should be as low as possible; e.g. just high enough to control leakage to a desired amount. Each sealing plate 7 can be made from an abrasion-resistant material or can comprise an abrasion resistant coating. In the present case, each sealing plate 7 is connected to the manifold 3. Due to the flexibility of the sealing plate, the sealing plate is at least partially always in contact with the circumferential surface of the drum, which reduces leakages. In order to further increase the contact area between the sealing plate 7 and/or the manifold 3 and the circumferential surface of the drum, the food mass feed member 1 comprises pressure means 20, 21, here rows of pressure cylinders.

Preferably, the inventive apparatus comprises cutting means 9, to cut of meat mass that extends over the outer circumference of the drum. The cutting means can be pressed against the drum by pressure means 22, for example a hose that extends here through the manifold and whose diameter can be changed by changing pressure in hose.

The downstream sealing area 6 are designed such that it comprises no holding means, i.e. the length of the sealing member 7 is designed such that the product cavities 12 in drum 11 are exposed to ambient pressure immediately after their filling is completed.

FIG. 2 shows the inventive sealing plate 7. This sealing plate comprises a first end 7.2, which is provided upstream from the feed channel 10 and a second end 7.3 which is provided downstream from the filling channel, relative to a drum, which rotates counter-clockwise. Both ends 7.2, 7.3 are provided in parallel to the axis of rotation of the drum. FIGS. 2a-d and g show a sealing plate 7 with an inner surface 7.1 that sealingly cooperates with the outer circumference of the drum 11. In the present case, the sealing plate comprises recesses 13 at its second end, i.e. downstream, from the filling channel. Each recess is aligned with the product cavities that pass underneath the recess. The shape of the recess partially corresponds to the shape, dimension and axial position of the product cavity. In the present case, the product cavity is a circle and the recess is a segment of a circle with preferably the same radius as the radius of the product cavity. Between two recesses 13 is a convexity 16, here a wedge shaped convexity.

FIG. 2c and FIG. 2d show sequence of the position of a product cavity relative to a recess 13, as the product cavity rotates past the recess. In FIG. 2d, the product cavity is completely open. However due to the convexity 17 between two recesses, the area between two product cavities is still partially in sealing connection with the surface of the drum, so that no product can leak out between two cavities.

However, the outer surface of the drum can be contaminated with fat and/or (mass) particles due to leakage in circumferential direction of the drum for example due to insufficient sealing between the sealing plate 7 and the surface of the drum 11. Such contaminations can be removed with recesses 14 at the first end 7.2 upstream from the feed channel 10 as depicted in FIGS. 2h-2l. Preferably, the shape of the recesses 14 at least partially coincides with the shape of the product cavities. The recesses 14 are preferably aligned with the product cavities that pass underneath. Each convexity 16, here wedge-shaped, resulting from two recesses 14, respectively, guides food mass on the surface of the food forming drum into or towards a product cavity 12, as can be seen from FIGS. 2h and 2i. Preferably, the tip 17.1 is sloped towards the adjacent recesses to guide food product from the tip 17.1 of the convexity 17 towards the product cavities, as can be seen from FIG. 2h. Food mass on the surface of the drum, for example fat/particles on the drum surface, will be directed towards the passing empty product cavities by the convexity 16, here a wedge 16. Food mass between two adjacent cavities in a row will also be scraped/ guide and directed into a passing empty cavity if the seal plate is provided with a profiled section at its first end 7.2. The combination of a convexity 16, here a wedge 16, provided between two recesses 14, will assure that the entire drum surface will be cleaned particularly at spots without cavities.

Reference now is made to FIGS. 2j-2l. The food mass feed member 1 is at the upstream sealing area 7.2 is provided with a negative angle 15. This negative angle can be part of housing 2 as depicted in the FIGS. 2e and 2f and 2j-2l and/or part of the stabilization block 8 and/or the sealing plate 7. When the drum surface is provided with a layer of food material, for example fat and/or particles this material will during counter-clockwise rotation of the drum move into the wedge created by this negative angle 15 and forced in the direction of the product cavities which will pass underneath the wedge during rotation of the drum. An additional advantage of a seal plate with recesses is a reduced friction surface between seal plate and outer surface drum which will result in less force on the drum and bearings.

In case the venting of the porous cavities during filling is insufficient, the dimension and/or shape of the sealing plate particularly in the upstream sealing area can be changed.

By decreasing the sealed length in circumferential direction of the drum, such the sealed length is smaller than the length of a product cavity in circumferential direction of the drum, there is a direct connection between the feed channel 10 and the ambient.

The minimum sealed length to be used to prevent leakage of the food mass, depends mainly on the food mass to be processed and/or the speed of rotation of the drum and should be as short as possible.

Figure 3:
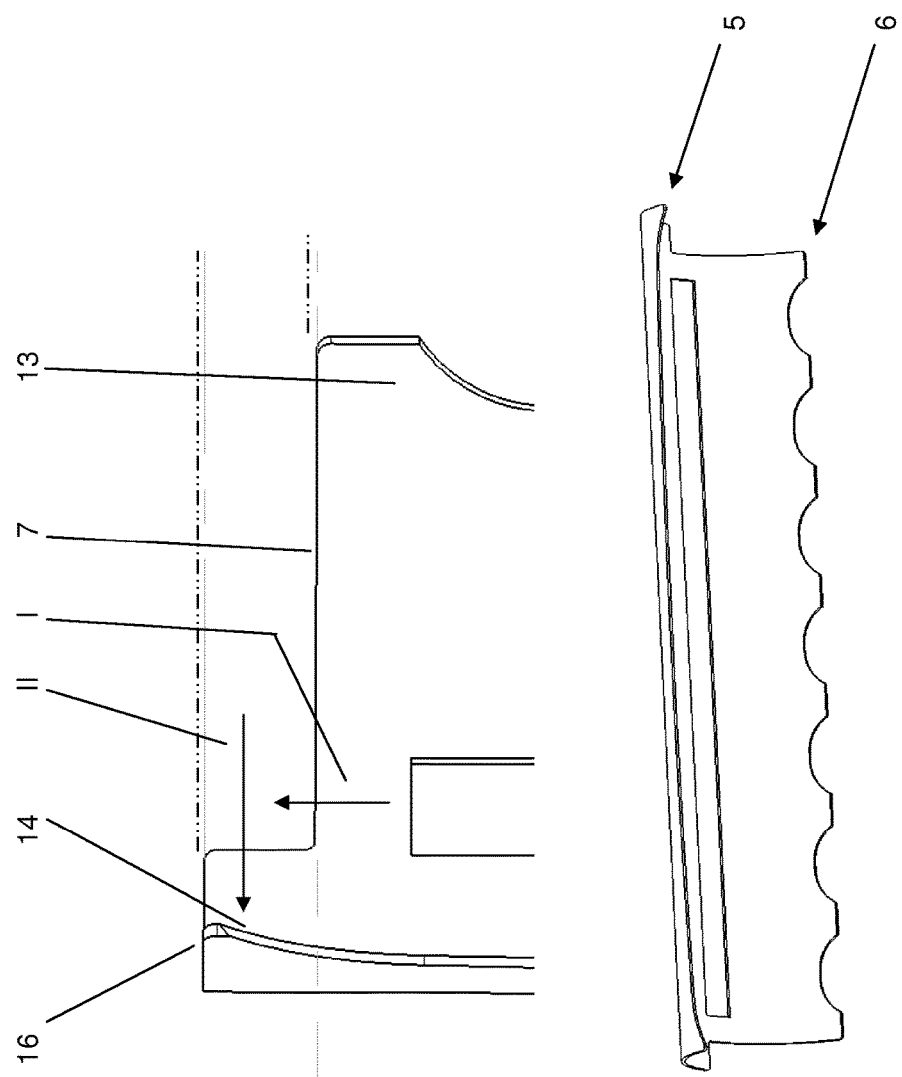

Reference is now made to FIG. 3 Beside that the outer surface of the drum can be contaminated with fat and/or (mass) particles due to leakage along an eventually used cutting member and the seal plate, leakage can also occur between the seal plate and the outer surface of the drum at the head ends of the manifold, see arrow I in FIG. 3, for example in case the pressure setting in this sealing area is not sufficient. Food mass leakage which sticks to the outer surface of the drum will be transported by the rotation of the drum in the direction of arrow II and will be caught and/or scraped into recess 14 at the first, upstream end of the sealing plate 7. The convexities 16 guide the food mass towards the center of the drum. In a more preferred embodiment recess 14 is partially ellipse-shaped.

Figure 4:
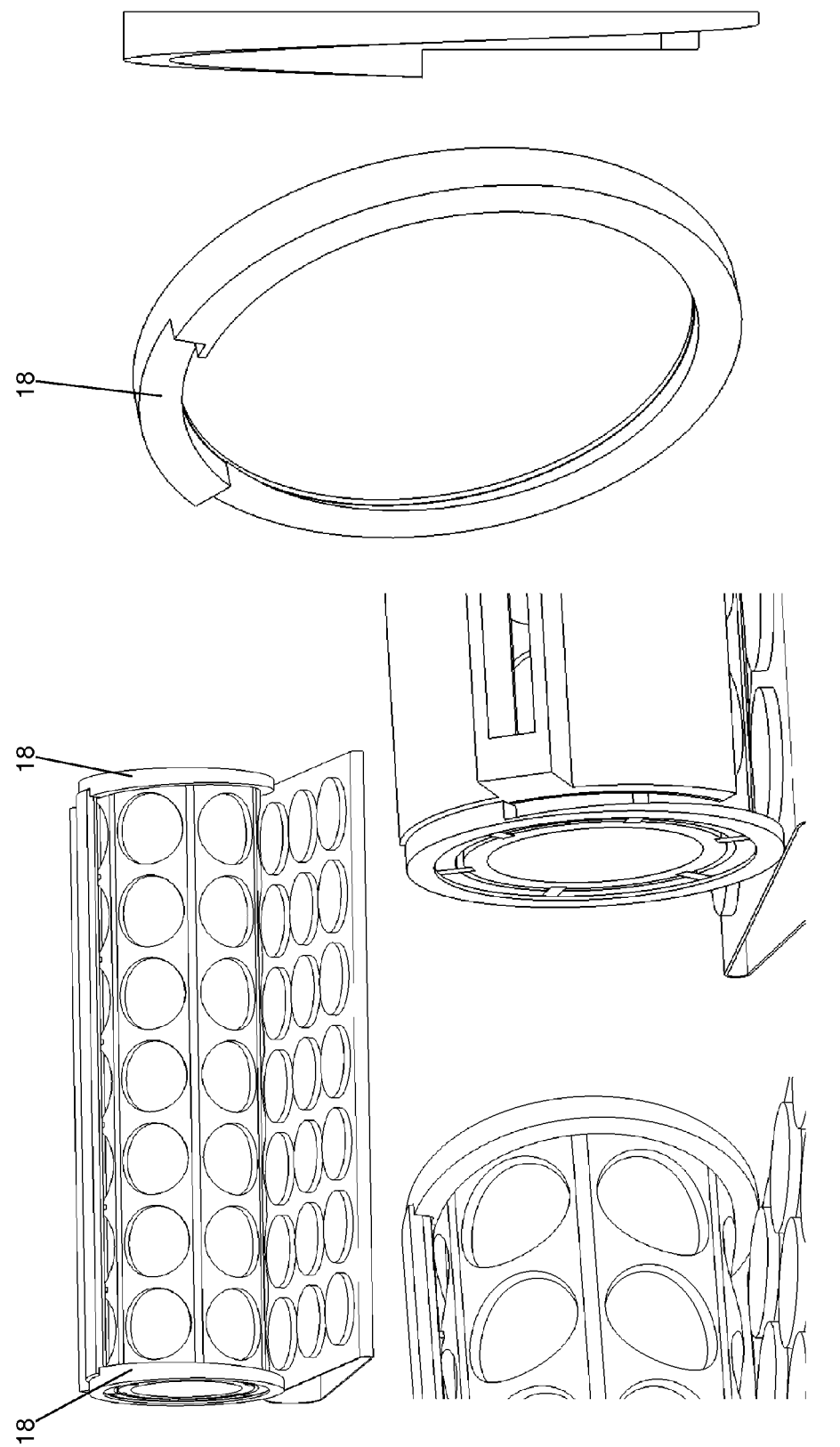
FIG. 4 shows the guiding means

FIG. 4 shows another embodiment of the inventive sealing member and/or the inventive food forming apparatus. In the present case, the sealing member comprises a guiding element 18, here a ring element 18, each partially covering a front end of the drum. The guiding element hinders food mass from leaking out of the side areas of the sealing member between the first- and the second end. In the present case, the ring extends over the circumference of the entire drum and will direct food mass, for example fat and/or particles back into a passing cavity. This ring element does not necessarily have to extend 360° and can be a separate part but also part of the forming apparatus 4, particularly part of one of the covers which will be used to cover the front ends of the drum during production.

Figure 5:
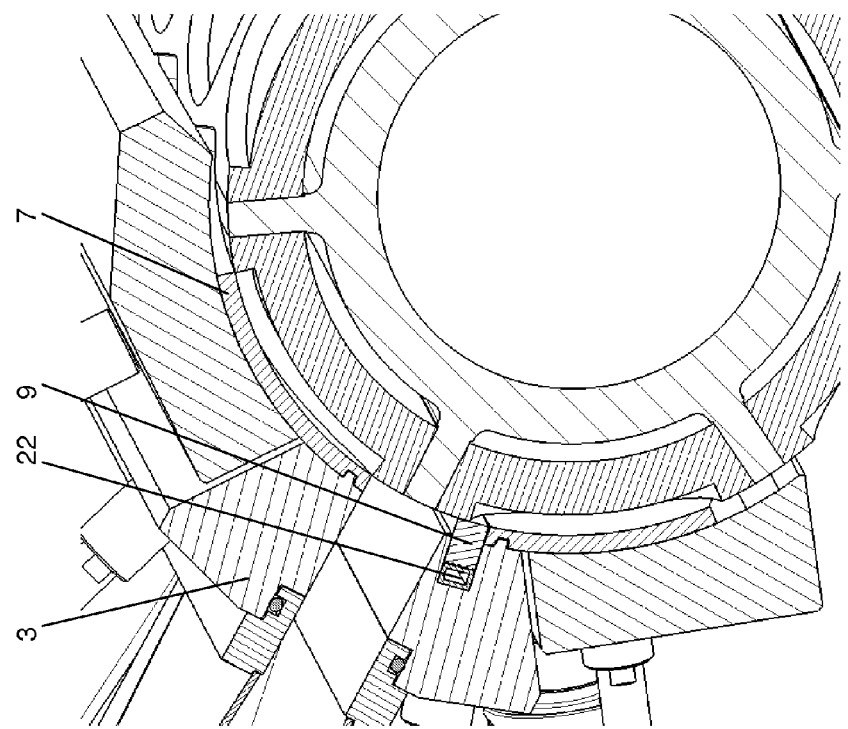

WO2013014010, which is herewith enclosed by reference and thus part of the disclosure of the present patent application. This reference describes in detail the inventive food forming apparatus, particularly the food forming member, e.g., the food forming drum. FIG. 5 essentially shows the food forming apparatus according to FIGS. 1a and 1b which is provided with a recess in manifold 3 which is provided with cutting member 9 and a pressure means 22, for example an expandable hose, which presses the cutting member against the drum and this assures a clean cut of the food mass above the product cavity as they pass by the cutting member due to the rotation of the drum.

Figure 6:
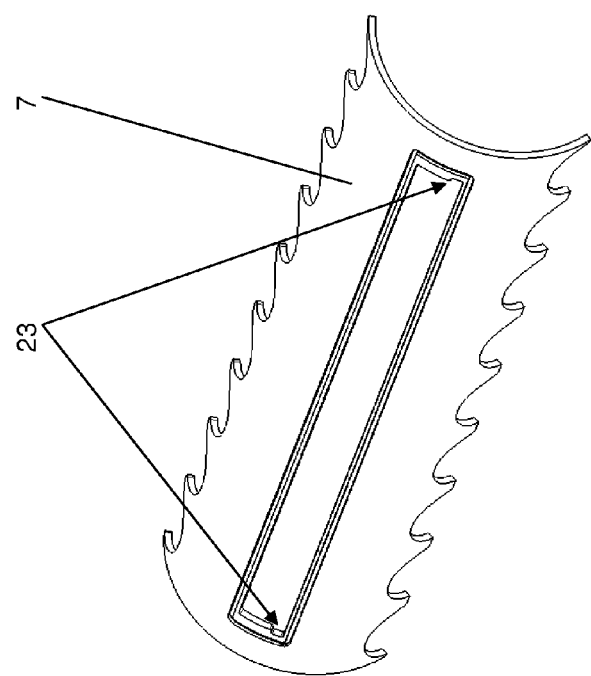
FIGS. 5-11 show a cutting member

FIG. 6 shows the sealing member here the sealing plate 7 also comprises a recesses 23. This recess 23 accommodates the cutting member 9.

Figure 7:
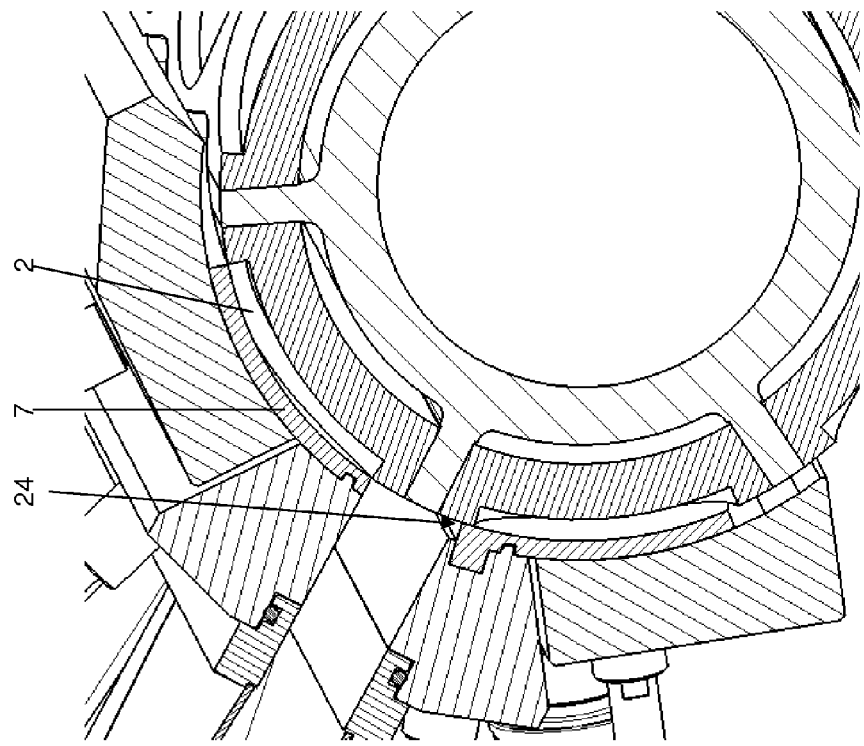

In the embodiment according to FIG. 7, the sealing member 7, here the sealing plate 7, will be pressed against the outer surface of the drum by the pressure member 21, for example a pressure cylinder, which presses the manifold against the drum. The sealing member 7 is provided with a cutting edge 24 and during rotation of the drum, the food mass pressed into product cavities 2 will be cut off at the circumference of the drum by cutting line 24. The cutting action can be improved by providing the sealing plate 7 with multiple cutting edges 24 for example a toothed profile as shown in FIG. 8.

Figure 9:
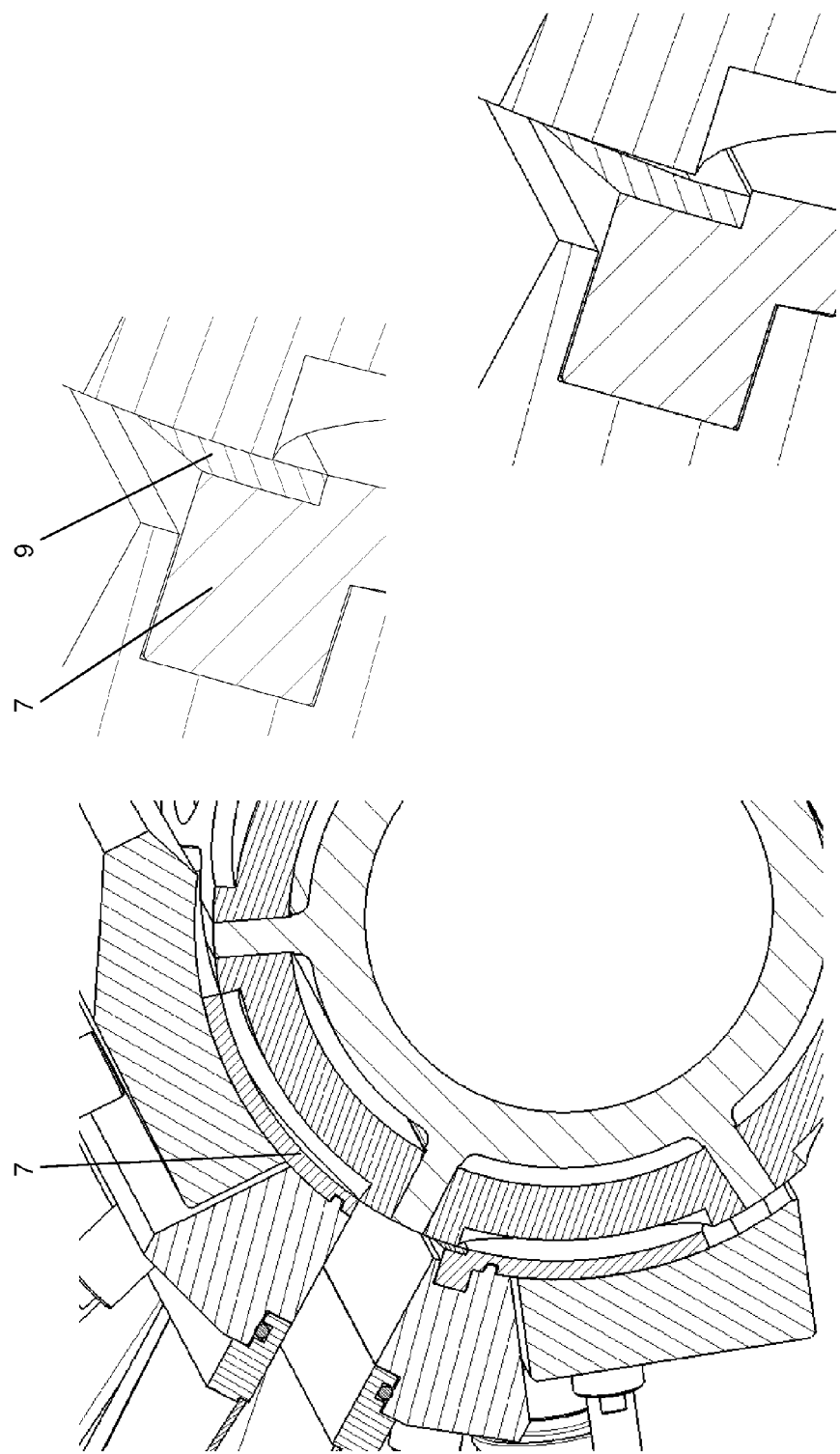

In FIG. 9 the sealing member 7 is provided with a recess wherein a cutting member 9 can be positioned which can be provided with the same radius as the outer circumference of the drum or with a deviant form to improve the cutting action.

Figure 10:
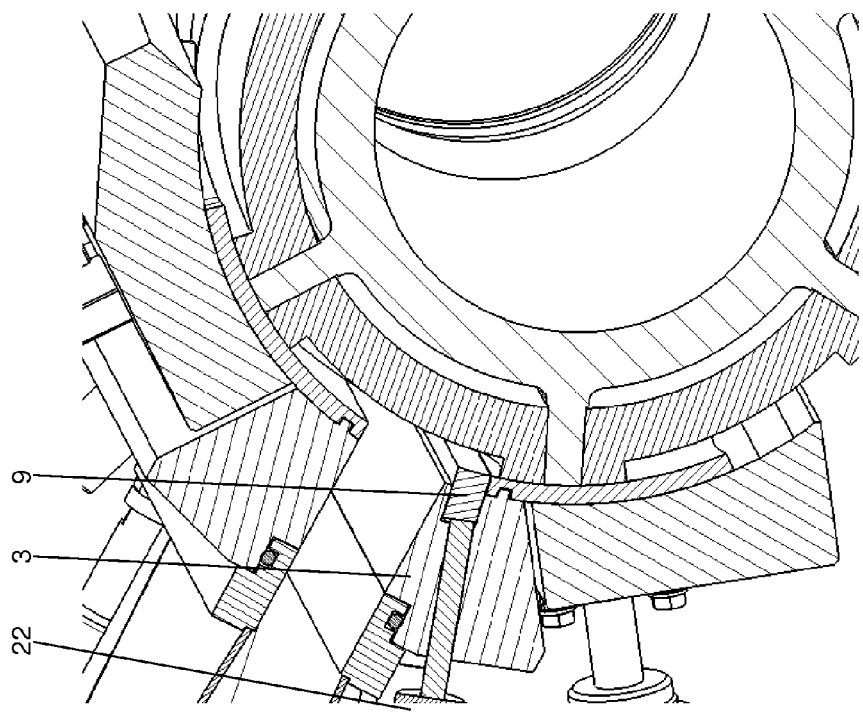

FIG. 10 shows an alternative of pressing the cutting member 9 again the drum. In comparison to the pressure means according to FIG. 5, here the pressure means 22 are in direct contact with the cutting member 9 and will not influence the pressure that is exerted on the sealing plate 7 by the manifold.

Figure 8:
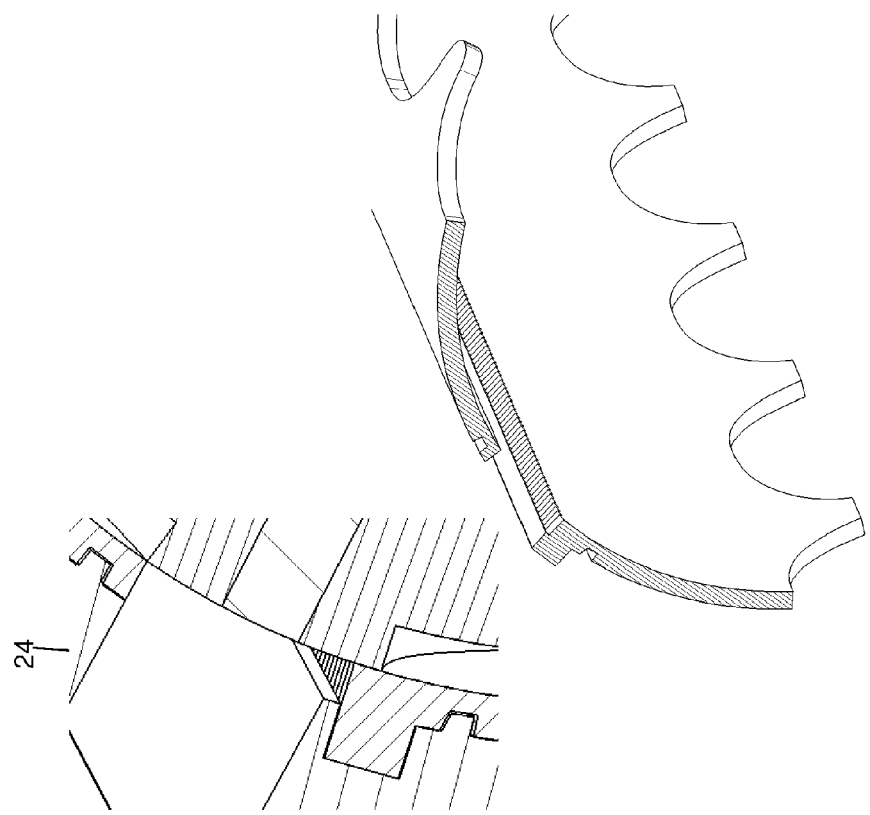
Figure 11:
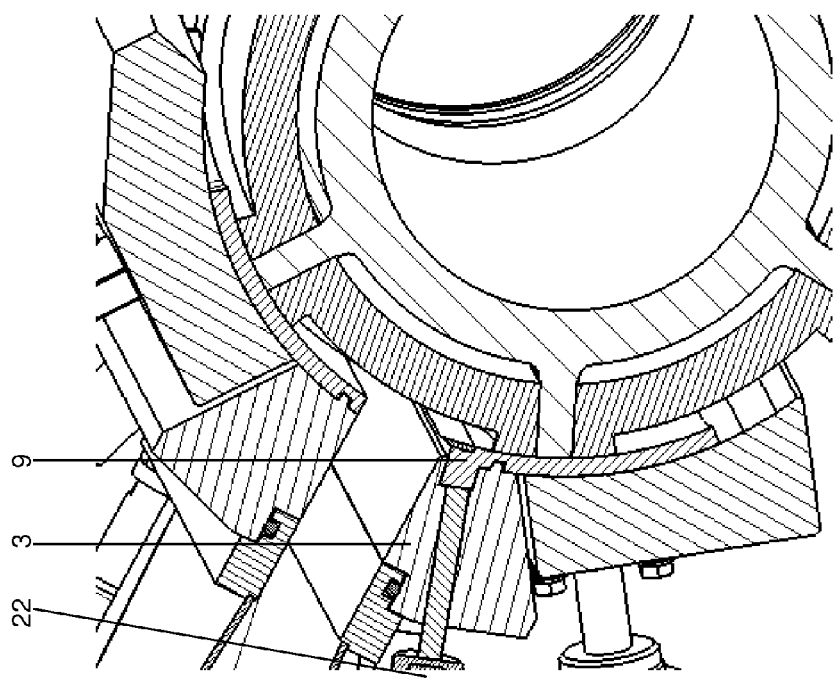

FIG. 11 shows the embodiment of FIGS. 7, 8 and 9 however pressure means 22 are positioned outside manifold 3.

WO2013014010 also describes a cutting member 9 which can be attached to the sealing member, here a sealing plate, by a form-, force- and/or friction-connection, e.g. by means of screws, a snap connection and/or other bonding means and can be made from, preferably reinforced plastic, but is, due to the high cutting forces, preferably made from a more wear resistant material without damaging the outer surface of the rotating drum. Additionally, the friction coefficient between outer drum surface and seal plate should be low. WO2013014010 describes further a plastic material which can be provided with small metal particles. In case pieces of the plastic cutting member break off and will end off in the formed food products, these plastic pieces can easily be found by checking the formed products with a metal scanner. Due to food safety all used materials have to be FDA approved.

Nano particles can also be integrated into the plastic material to improve its detectability in the resulting food product and/or to increase its strength.

In all embodiments the cutting member should always be in contact with the outer surface of the drum and/or pressed against the drum and the design of the pressure means and/or cutting member should be such that in case of deformation of the drum the cutting member will follow the deformation. The drum functions as a sheer-edge.

REFERENCE SIGNS 1 food mass feed member
2 housing
3 manifold
4 forming apparatus
5 upstream sealing area
6 downstream sealing area
7 sealing member, seal plate, flexible plate
7.1 surface of the sealing member
7.2 first end of the sealing plate, upstream end of the sealing plate
7.3 second end of the sealing plate, downstream end of the sealing plate
8 stabilization block
9 cutting member
10 feed channel
11 food forming member, drum
12 product cavities
13 recess in downstream sealing area
14 recess in upstream sealing area
15 thickness, reduced thickness, negative angle at the sealing member 7
16 wedge in recess upstream sealing area
17 convexity, wedge shaped convexity
17.1 tip of the convexity, tip of the wedge shaped convexity
18 guiding element, ring element/curved guide
20 pressure means sealing member
21 pressure means manifold
22 pressure means cutting member
23 recess in seal plate for cutting member
24 cutting member, cutting line, cutting edges

The invention claimed is:

1. A sealing member comprising:
a surface that interacts sealingly with a surface of a food forming member;
an upstream first end; and
an opposite downstream second end;
wherein the upstream first end of the sealing member is located upstream of a feed member that supplies food product to the food forming member, and the downstream second end of the sealing member is located downstream of the feed member;
wherein the upstream first end comprises a multitude of recesses and convexities,
wherein one of the convexities is located between a respective two of the recesses,
wherein the food product that is transported by the food forming member towards the sealing member is guided toward or into product cavities defined in rows around the surface of the food forming member with the convexities and the recesses at the upstream first end of the sealing member
wherein each of the recesses has a shape that generally corresponds to a shape of the product cavities, and each of the recesses are aligned with the product cavities extending in one of the rows; and
wherein each of the convexities are aligned with the surface of the food forming member located between the product cavities.

2. The sealing member according to claim 1, wherein a tip of each of the convexities is sloped towards each of the recesses.

3. The sealing member according to claim 1, wherein each of the convexities are shaped as a wedge.

4. The sealing member according to claim 1, wherein a thickness of the sealing member and/or housing and/or stabilization block is reduced at least at one of the upstream first end and the downstream second end.

5. The sealing member according to claim 1, wherein the sealing member comprises a guiding element which guides the food product towards a center of the sealing member.

6. The sealing member according to claim 1, wherein the sealing member comprises a cutting edge.

7. The sealing member according to claim 6, wherein the cutting edge and the sealing member are a single piece.

8. The sealing member according to claim 7, wherein the cutting edge of the sealing member and/or a cutting member is profiled, or toothed.

9. A food forming apparatus comprising the sealing member according to claim 1;
wherein the food forming member comprises a feed channel through which the food product is pressed into the product cavities, and
wherein the sealing member extends around the surface of the food forming member.

10. The food forming apparatus according to claim 9, wherein a cutting edge extends parallel to the surface of the food forming member.

11. The food forming apparatus according to claim 9, wherein the food forming apparatus comprises a manifold around the feed channel, and
wherein a pressure extended on a cutting member is independent from a pressure extended on the manifold.

12. The sealing member according to claim 1, wherein the downstream second end of the sealing member comprises a multitude of downstream recesses and downstream convexities, and
wherein the downstream recesses at least partially correspond to the shape of the product cavities.

13. The sealing member according to claim 1, wherein the upstream first end of the sealing member is free from contacting the surface of the food forming member, and
wherein a gap is defined between the sealing member and the surface of the food forming member, and the gap decreases from the upstream first end towards a filling recess.

14. The sealing member according to claim 1, wherein the sealing member is fixed to a frame and stationary, and the food forming member rotates relative to the stationary sealing member.

15. The sealing member according to claim 14, wherein during filling of the product cavities in the food forming member with the food product, the sealing member sealingly interacts with the surface of the food forming member to prevent the food product from spilling out of the product cavities.

16. A sealing member comprising:
a sealing surface in communication with a rotating food forming member, the food forming member having a plurality of product cavities extending in rows around a surface of the food forming member;
a first end and an opposing second end, the first end is located upstream of a feed member that supplies food product to the food forming member, the second end is located downstream of the feed member;
a plurality of first recesses at the first end, each of the first recesses has a shape that corresponds to a shape of the product cavities, and each of the first recesses are aligned with the product cavities extending in one of the rows;
a plurality of wedge-shaped first convexities at the first end, wherein one of the first convexities is located between a respective two of the first recesses, and each of the first convexities are aligned with a surface of the food forming member located between the product cavities;
a plurality of second recesses at the second end, each of the second recesses have a shape that partially corresponds to the shape of the product cavities so that smearing of the food product is reduced;
a plurality of wedge-shaped second convexities at the second end, wherein one of the second convexities is located between a respective two of the second recesses;
a cutting recess accommodating a cutting member, the cutting recess is located between the first end and the second end, the cutting member cuts the food product that extends out of the product cavities;
wherein the first recesses and the first convexities move the food product located on the surface of the food forming member into the product cavities;
wherein the sealing member is fixed to a frame and stationary, and the food forming member is a drum that rotates relative to the stationary sealing member; and
wherein during filling of the product cavities in the food forming member with the food product, the sealing member sealingly interacts with the surface of the food forming member to avoid the food product from spilling out of the product cavities.

* * * * *